Patented May 30, 1939

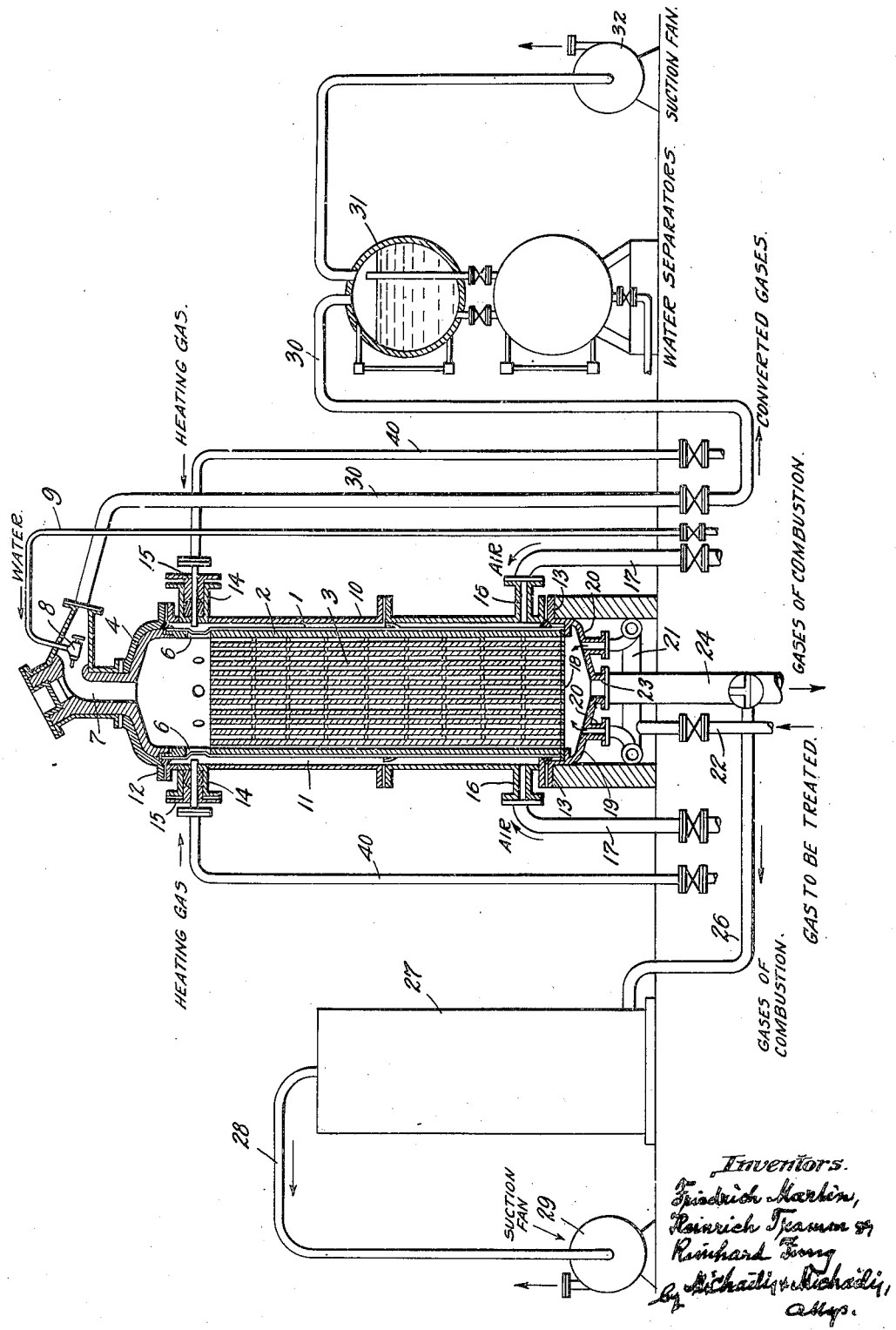

2,160,170

UNITED STATES PATENT OFFICE 2,160,170

HEAT TREATMENT OF HYDROCARBON GASES TO DEHYDROGENATE THE SAME

Friedrich Martin, Oberhausen, Heinrich Tramm, Oberhausen-Holten, and Reinhard Jung, Oberhausen-Sterkrade, Germany, assignors to Ruhrchemie Aktiengesellschaft, Oberhausen-Holten, Germany Application June 21, 1935, Serial No. 27,688
In Germany March 18, 1935

8 Claims. (Cl. 260—679)

Our invention relates to the thermic treatment of gases and more especially to the conversion of hydrocarbons into valuable products, for instance of methane or other compounds of the methane series into acetylene or of mixtures of methane and ammonia into hydrocyanic acid at high temperatures.

It is an object of our invention to provide means whereby such treatment of gases and more especially hydrocarbons at high temperatures can be carried through in a simpler and more efficient manner than was hitherto possible.

As is well known to those skilled in the art, the conversion of hydrocarbons into valuable products by heating them to high temperatures is connected with particular difficulties owing to the necessity of carrying the reactions through in vacuo. Thus methane, ethane or ethylene are converted into acetylene at temperatures ranging between about 1000 and 1800° C. in a vacuum which may be as low as one tenth of an atmosphere. Similarly the hydrocyanic acid, which plays an important role in the synthetical production of organic compounds, is obtained from methane or its homologs by heating same to a high temperature in a vacuum, or from acetylene by acting thereon with ammonia at high temperatures in vacuo.

The obvious means for carrying through thermic reactions is an oven of the regenerative type, which is first heated up by means of hot gases of combustion or the like, to be thereafter used as a reaction chamber, in which the gases to be treated are heated to reaction temperature. Operation of a regenerative furnace, built up from refractory bricks and ceramic material, under a vacuum appeared almost impossible, since the heating up of the oven would have to be effected under ordinary pressure and the oven thereafter evacuated for the reaction to be carried through, the alternating production of a vacuum and ordinary pressure being expected to lead to destruction of the checker work and of the walls of insulating material surrounding such checker work, this destructive action being accompanied by a far reaching and highly undesirable separation of carbon from the hydrocarbons under treatment. During each changing over from ordinary to reduced pressure and vice versa the gases may be expected to permeate the pores and joints of the oven material and this passage of hot gas through the material is the cause of a speedy destruction.

We have now found that contrary to all expectations the regenerative furnace, if suitably designed to adapt it to the particular requirements of these reactions, is excellently suited for the purpose here in view.

We have found that one of the principal conditions to be fulfilled is the building up of the checker work, or at least that part of the checker work which fills the reaction zone from a highly refractory, practically poreless material, which also remains substantially non-porous at the high temperatures required in the process. The invention shall be explained more in detail as applied to a regeneration furnace filled with a checkerwork built up of such practically non-porous material. The walls of the oven must be lined with a highly refractory material capable of resisting the stresses arising during the reaction.

We have for instance found an aluminium oxide material prepared by melting aluminium oxide and forming the crushed material together with suitable binders into bricks or plates burnt at about 1800° C. is useful as a lining for the oven walls. Preferably this lining should be comparatively thin, measuring from about 30-90 mms., since it is impossible to produce it altogether free from pores, so that its mass must be kept as low as possible in order to reduce the action of the gas on the lining and vice versa to a minimum. In order to obtain a compensation for the drawback of insufficient insulation by a comparatively thin refractory lining, we surround the regenerator or heat storer with a double shell, between the walls of which cold gases are passed through. The heat taken up by these gases is preferably utilized by using the gases thus preheated for the heating up of the heat storer, the air required for combustion then serving as a cooling medium.

We prefer surrounding the lining by a shell consisting of a metal which remains unchanged at high temperatures, this shell being in its turn surrounded by a pressure resistive outer shell packed against the inner shell by an elastic stuffing box or the like.

Whenever the oven is changed over to evacuation, the annular space between the two shells is evacuated also, whereby the heat resistive metal is relieved of pressure, the atmospheric pressure being taken up by the outer shell exclusively. While the reaction is going on, the annular space between the two shells, if the gases taking part in the reaction might affect the metal, may be protected by means of an inert gas passed through the space.

The automatic throwing over from the heating period at normal pressure to the reaction period and vacuum is preferably effected in such manner, that after the heating gas and air supplies have been cut off, the interior of the oven is connected to a large chamber previously evacuated by means of a suitable vacuum pump (suction fan), into which the combustion gases filling the oven are sucked. The oven is then connected to another pump or suction fan which sucks the reaction gas into the oven under reduced pressure.

Preferably the gases to be reacted in the oven are passed through it in a direction counter to that of the heating gases.

The checker work filling the oven should present to the gases a large surface and should possess a high heat storing capacity, being at the same time as inert as possible with respect to the gases to be reacted. We have found that a material with a smooth surface and free of pores, which contains as little silica and iron as possible, is particularly suited for this purpose. We prefer using materials prepared from sintered alumina or from beryllium oxide or mixtures of the two. Obviously the materials forming that part of the checker work, which fills the hottest reaction zone, should be of the highest grade and more resistant than the material located in the less heated parts of the regenerator, which may be filled with fire-clay or porcelain. Preferably plates enabling straight-line passages for the gas to be created have been proved particularly suitable.

We prefer passing the heating gases through the furnace from above and the gas to be reacted from below. We are thus enabled to arrange the parts supporting the checker work in the colder zone and to relieve the hottest part of the checker work, which is most highly stressed by the heat and reaction, from the pressure of the material lasting thereon.

We cool the gases of reaction exhausted from the oven by spraying a suitable cooling liquid such as water into the gas, but we may as well effect the cooling by causing the gas to flow in contact with surfaces irrigated with the cooling liquid.

In carrying out the thermic treatment of gases in accordance with our invention we have used with particular advantage an oven such as illustrated diagrammatically by way of example in the drawing annexed to this specification and forming part thereof, which shows this oven and the apparatus connected to it in axial section.

Referring to the drawing, 1 is the inner metallic shell made from a high grade steel alloy containing, besides iron, from 6–23% chromium, from 0.8–2% aluminium, up to 1% silicon, small percentages of molybdenum and vanadium and less than 0.01% carbon. Steel alloys of this type are sold under the trade name "Sicromal".

2 is the refractory lining covering the inner shell, this lining being composed for instance of 98–99.8% $Al_2O_3$, 1.0–0.1% $SiO_2$, 0.2–0.3% CaO and 0.1–0.4% $Fe_2O_3$. The plates or bricks from which this lining is built up are preferably from 30 to 90 mms. thick.

3 is the checker work filling the oven, the plates constituting this checker work being for instance composed of about 90% BeO, about 9% $Al_2O_3$ and about 1% $SiO_2+Fe_2O_3+CaO+MgO$. 4 is a refractory cap mounted on top of the regenerator and formed with inlet openings 5 for the heating gas registering with similar openings 6 in the inner shell. The cap is formed with a neck 7 serving as an outlet for the reacted gases and 8 is a spray nozzle supplied with water through a pipe 9 and serving to form a veil of cooling water in the path of the hot escaping reaction gases. 10 is the outer pressure resisting shell and 11 is the annular space separating the two shells 1 and 10. The outer shell 10 is packed against the top end of the inner shell by elastic packings 12 and against the bottom end by similar packings 13. 14 are nozzles extending across the outer shell and into the openings 6 of the inner shell, these nozzles being packed by means of stuffing boxes 15 and serving to lead the gas supplied through pipes 40 into the furnace to heat it up. 16 are sockets at the bottom end of the outer shell 10 serving as air inlets connected with the air supply pipes 17, the air entering through these sockets passing through the annular space 11 between the two shells and mixing with the heating gas entering through the nozzles 14, which is then burnt in the oven to heat it up to reaction temperature. 18 is a grate supporting the checker work and 19 is the bottom of the oven, from which extend sockets 20, which are connected by a main 21 to the pipe 22 supplying the gas to be treated, another socket 23 being connected to the exhaust pipe 24, through which the gases of combustion are withdrawn, a two-way valve 25 allowing the pipe 24 to be connected to a pipe 26 leading to a vacuum chamber 27, which is in turn connected by a pipe 28 to a suction fan 29. 30 is a pipe connected to the cap 4 and serving to withdraw the gases of reaction, which are passed into a water separator 31 and carried away by a suction fan 32.

In operating this furnace it is first heated up to a temperature of about 1600° C. under normal pressure by burning the gases introduced through the nozzles 14 with the air introduced at 16, the flames extending through the oven and the channels formed in the checker work from the top towards the bottom of the oven, the valve 25 being set to allow the gases of combustion to escape through the pipe 24. On the reaction temperature being reached, the gases of combustion still filling the oven are removed by connecting the pipe 24 by means of the valve 25 with the pipe 26 leading to the vacuum chamber 27 in which a vacuum has in the meantime been established by means of a suction fan 29. Now the gas mixture to be reacted in the oven, for instance a gas containing 60% methane, is sucked through the oven by the fan 23, the pressure being reduced by suction to about 50 mms. mercury column. The rate of passage of gas through the oven may for instance be 0.8 cm.$^3$ per minute, which means that the time of heating the gas in the hottest zone of the oven amounts to a few hundredths of a second. In this manner from 40–50% of the methane in the gas supplied to the oven were converted into acetylene, the gas escaping through pipe 30 containing from 8–9% acetylene.

The consumption of heating gas (illuminating gas, coke oven gas, blast furnace gas, producer gas or the like) corresponds to a heat efficiency of about 75–80% which shows that in spite of the rather imperfect heat insulation the thermic effect obtainable in the oven was excellent. The heating period at normal pressure extended through about one minute and the reaction period at reduced pressure also to one minute.

In a similar manner a mixture consisting of two parts ethane and one part ammonia was passed into the oven, heated to a maximum temperature of 1400° C., the gas pressure amounting to 45 mms. mercury column absolute. After washing out the hydrocyanic acid formed in the reaction and the ammonia, which had escaped conversion, a gas mixture was obtained containing about 20% acetylene, 70% hydrogen, 8% methane and 2% nitrogen. About 40% of the ammonia were thus converted into hydrocyanic acid, while 55-60% of the ammonia escaped from the furnace unchanged.

The term "materially higher pressure" as used in the claims is intended to refer to a pressure of a higher order of magnitude as compared with the vacuum employed, and preferably to a pressure approaching, or identical with, normal pressure.

Various changes may be made in the details disclosed in the foregoing specification without departing from the invention or sacrificing the advantages thereof.

We claim:

1. The method of chemical conversion of hydrocarbon gases into other compounds containing C and H which comprises passing such gas under a pressure far below atmospheric pressure over and in contact with a highly refractory substantially non-porous material practically free from silica and iron which has been preheated under a materially higher pressure to a temperature above 1000° C. and remains substantially non-porous at such temperature.

2. The method of chemical conversion of hydrocarbon gases into other compounds containing C and H which comprises passing such gas under a pressure far below atmospheric pressure over and in contact with a highly refractory substantially non-porous material practically free from silica and iron which has been preheated under a materially higher pressure to a temperature ranging approximately between 1400 and 1600° C. and remains substantially non-porous at such temperature.

3. The method of chemical conversion of hydrocarbon gases into other compounds containing C and H which comprises passing such gas under a pressure far below atmospheric pressure over and in contact with a highly refractory substantially non-porous material practically free from silica and iron which has been preheated under a materially higher pressure to a temperature above 1000° C., and remains substantially non-porous at such temperature, by passing gases of combustion in contact with said material.

4. The process of claim 1, in which the refractory material is aluminium oxide practically free from silica and iron.

5. The process of claim 1, in which the refractory material is beryllium oxide practically free from silica and iron.

6. The process of claim 1, in which the refractory material is present under the form of plates arranged to offer straight passages to the gases.

7. The process of claim 1 as applied to the treatment of methane for the production of acetylene.

8. The process of claim 1, in which the refractory material is a mixture of aluminium oxide and beryllium oxide practically free from silica and iron.

FRIEDRICH MARTIN.
HEINRICH TRAMM.
REINHARD JUNG.